United States Patent
Cavaliere et al.

(10) Patent No.: US 10,270,555 B2
(45) Date of Patent: Apr. 23, 2019

(54) OPTICAL BEAMFORMING

(71) Applicant: Telefonaktiebolaget LM Ericsson (publ), Stockholm (SE)

(72) Inventors: Fabio Cavaliere, Pisa (IT); Antonio D'Errico, Pisa (IT); Marzio Puleri, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/741,074

(22) PCT Filed: Jun. 30, 2015

(86) PCT No.: PCT/EP2015/064909
§ 371 (c)(1),
(2) Date: Dec. 29, 2017

(87) PCT Pub. No.: WO2017/001003
PCT Pub. Date: Jan. 5, 2017

(65) Prior Publication Data
US 2018/0198551 A1    Jul. 12, 2018

(51) Int. Cl.
*H04B 10/00* (2013.01)
*H04J 14/02* (2006.01)
(Continued)

(52) U.S. Cl.
CPC ....... *H04J 14/0212* (2013.01); *H01Q 3/2676* (2013.01); *H04B 10/11* (2013.01);
(Continued)

(58) Field of Classification Search
USPC .................................. 398/115–117
See application file for complete search history.

(56) References Cited

U.S. PATENT DOCUMENTS

| 6,426,721 | B1 * | 7/2002 | Obara | H01Q 3/2676 342/372 |
| 7,084,811 | B1 * | 8/2006 | Yap | H01Q 3/2676 342/373 |

(Continued)

*Primary Examiner* — Agustin Bello
(74) *Attorney, Agent, or Firm* — Patent Portfolio Builders, PLLC (57) ABSTRACT

A beamforming device for a phased array antenna, comprising: a laser light source (2) arranged to provide an optical spectrum comprising a plurality of spaced wavelengths, and a distribution unit (4) configured to distribute one or more of the plurality of spaced wavelengths onto a plurality of optical paths (6). A wavelength selection device (8) configured to receive the plurality of spaced wavelengths on each of the plurality of optical paths. One or more phase shift unit (12) connected to a said wavelength selection device, wherein the phase shift unit is configured to introduce a phase shift to a received wavelength. The wavelength selection device on each optical path is configured to selectively transmit a wavelength to the phase shift unit. The wavelength selection device is configured to receive the said phase shifted wavelength from the phase shift unit (12). The beamforming device further comprising a heterodyning device (16) configured to generate a signal for transmission by an element of the phased array antenna, wherein the heterodyning device is configured to heterodyne a plurality of selected spectral components of the spaced wavelengths of the laser light source.

20 Claims, 3 Drawing Sheets

(51) Int. Cl.
*H01Q 3/26* (2006.01)
*H04B 10/2575* (2013.01)
*H04B 10/11* (2013.01)
*H04B 10/50* (2013.01)
*H04B 10/64* (2013.01)
*H04B 10/80* (2013.01)

(52) U.S. Cl.
CPC ....... *H04B 10/2575* (2013.01); *H04B 10/503* (2013.01); *H04B 10/64* (2013.01); *H04B 10/80* (2013.01); *H04B 2210/006* (2013.01)

(56) References Cited

U.S. PATENT DOCUMENTS

| | | | | |
|---|---|---|---|---|
| 2007/0206958 A1* | 9/2007 | Chen | .................... | H01Q 3/2676 398/183 |
| 2014/0231627 A1* | 8/2014 | Wakatsuki | ........... | H01Q 3/2676 250/208.2 |

\* cited by examiner

OPTICAL BEAMFORMING

TECHNICAL FIELD

Aspects of the disclosure relate to a method of optical beamforming and an apparatus for optical beamforming.

BACKGROUND

Phased array antennas (PAAs) allow steering of transmitted Radio Frequency (RF) beam without physically moving the antenna. Phased array antennas are used in an increasing number of applications such as multifunctional radars and communications.

Beamforming is a signal processing technique for adapting the transmission or reception direction of a directional antenna. This can be achieved by feeding different radiation elements of the antenna with phase shifted copies of the same signal. The phase shift values are adjusted so that the radiation elements experience constructive interference in the wanted direction, obtaining a high directivity value.

Moving to the next generation 5G mobile networks, optical beamforming may be used to handle a challenging link budget at higher frequencies, lower emission power levels prescribed by regulation and deployment in densely populated areas.

Beamforming may be achieved by processing electrical signals. At higher frequencies and bandwidths, electrical circuits become more sensitive to oscillator phase noise, phase dependency on the frequency (squint) and signal leakage between adjacent antenna elements.

To mitigate these issues, optical beamforming schemes have been proposed, where the generation of low noise radio frequencies (RF) and accurate phase shift values uses optical devices.

Carrier aggregation is a feature introduced in LTE-Advanced (3GPP Release 10) to increase the mobile connection bandwidth. The frequency selectivity of the radio frequency circuits makes it difficult to combine beamforming and carrier aggregation, especially inter-band carrier aggregation, without the full duplication of the electrical circuits for any frequency to support.

SUMMARY

A first aspect of the present disclosure provides a beamforming device for a phased array antenna, comprising: a laser light source arranged to provide an optical spectrum comprising a plurality of spaced wavelengths, and a distribution unit configured to distribute one or more of the plurality of spaced wavelengths onto a plurality of optical paths. A wavelength selection device configured to receive the plurality of spaced wavelengths on each of the plurality of optical paths. One or more phase shift unit connected to a said wavelength selection device, wherein the phase shift unit is configured to introduce a phase shift to a received wavelength. The wavelength selection device on each optical path is configured to selectively transmit a wavelength to the phase shift unit. The wavelength selection device is configured to receive the said phase shifted wavelength from the phase shift unit. The beamforming device further comprising a heterodyning device configured to generate a signal for transmission by an element of the phased array antenna, wherein the heterodyning device is configured to heterodyne a plurality of selected spectral components of the spaced wavelengths of the laser light source.

Thus, the device effectively carries out optical beamforming for one or more carriers.

A second aspect of the present disclosure provides method of beamforming for a phased array antenna, comprising: receiving a laser light source arranged to provide an optical spectrum comprising a plurality of spaced wavelengths, and distributing one or more of the plurality of spaced wavelengths onto a plurality of optical paths. The method further comprises introducing a phase shift to a received wavelength by selectively transmitting a wavelength to a phase shift unit, and receiving the said phase shifted wavelength from the phase shift unit; and generating a signal for transmission by an element of the phased array antenna, by heterodyning a plurality of selected spectral components of the spaced wavelengths of the laser light source.

A further aspect of the present disclosure provides a computer program product, configured when run on a computer to carry out a method according to any example.

BRIEF DESCRIPTION OF THE DRAWINGS

Embodiments of the present disclosure will now be described, by way of example only, with reference to the accompanying drawings in which.

DETAILED DESCRIPTION

The apparatus and method described provides for combining optical beamforming and carrier aggregation without requiring the duplication of beamforming circuits and antenna element for each supported frequency. Aspects of the disclosure select a subset of optical frequencies of an equally spaced frequency comb, so that the selected frequencies, beating in a photodiode, generate the desired set of radio frequencies. Some of the optical frequencies are optically modulated with the antenna radio modulating signal.

Figure 1:
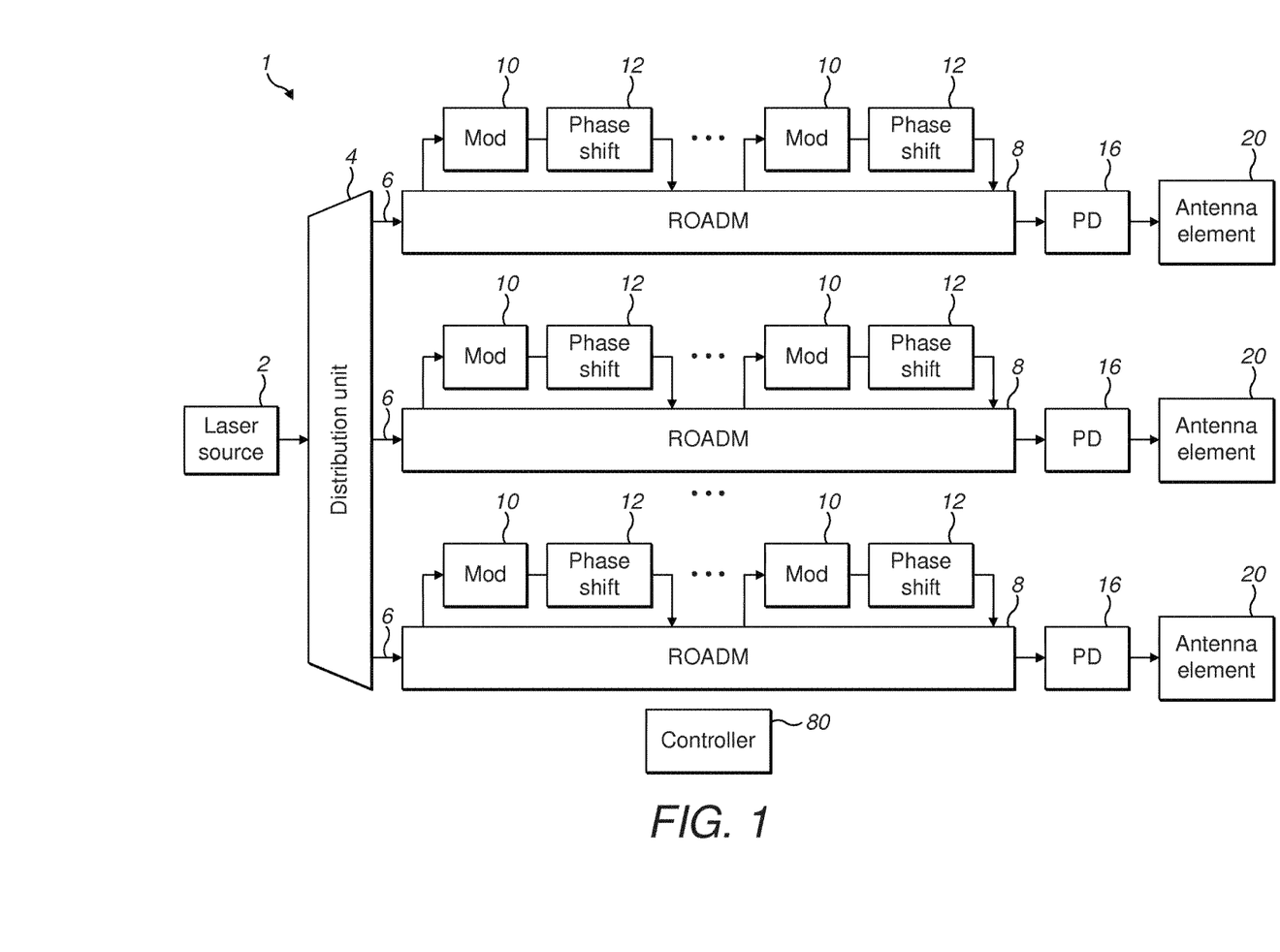
FIG. 1 is schematic illustration of a first example of a device according to an example of the disclosure.

FIG. 1 shows an exemplary beamforming device 1. The beamforming device 1 comprises a mode locked laser source 2 or receives light from a mode locked laser source. The mode locked laser source 2 is configured to generate a comb of phase synchronous, continuous wave (CW) optical frequencies. The optical frequencies may alternatively be described as wavelengths or spectral components.

The laser source 2 is configured to generate an optical spectrum comprising a plurality of beams or spectral components having discrete wavelengths. In some examples, the discrete wavelengths may correspond to longitudinal modes of the laser. The modes are separated by a repetition wavelength or frequency. For example, the laser source is a fiber laser, e.g. a fiber mode-locked laser. In some aspects, the laser source of the receiver is the single mode-locked laser only, avoiding a need for multiple lasers or a tunable laser.

The entire comb, or subsets of its frequencies, are transmitted to a distribution unit 4. The distribution unit 4 is configured to distribute the spectral components to different optical lines or paths 6. Three such lines or paths 6 are shown as an example, and the device 1 may comprise more or less paths 6.

In some examples, the distribution unit 4 is an optical splitter. The splitter distributes all of the received wavelengths to all of the optical paths. In a further example, the distribution unit 4 is a wavelength selective switch (WSS). In some aspects, the WSS is implemented as an integrated photonic device. For example, the WSS uses a silicon photonics structure. In some examples, the WSS is based on micro-ring resonators. The WSS provides for a pre-selection of the optical frequencies sent into each path 6, reducing the overall loss or complexity of the device.

One or more wavelength selection device 8 is connected to each line or path 6. The wavelength selection device 8 is configured to receive all the wavelengths transmitted on its connected path 6. In some examples, the wavelength selection device is a Reconfigurable Optical Add Drop Multiplexer (ROADM). In some examples, the ROADM is implemented using one or more micro-ring resonators, and/or is implemented as an integrated photonic device. A ROADM is provided for each optical path 6, i.e. for each element of the antenna.

In some examples, the beamforming device 1 is configured to carry out one of three functions on a particular wavelength on the path 6. The beamforming device may pass the optical wavelength to one or more further elements of the beamforming device prior to outputting the wavelength to an antenna element, output the wavelength without passing to the one or more further elements or stop the wavelength (i.e. do not output the wavelength).

As a ROADM, the wavelength selection device comprises one or more drop port 9 and one or more add port 11. In some examples, the wavelength selection device 8 comprises a plurality of drop ports and a plurality of add ports. These functions are now discussed in more detail.

The wavelength selection device 8 is configured to selectively pass one or more wavelengths to one or more further elements or devices of the beamforming device. The wavelength selection device selects wavelengths according to the beam to be formed at the antenna. The wavelength selection device 8 switches a determined wavelength to the drop port 9 to output a wavelength. In the example shown, the wavelength is output from the phase shift unit 10 to a modulator 10.

The wavelength selection device 8 is configured to output a selected wavelength, via the drop port 9, to a modulator 10. The modulator 10 is configured to apply a modulation to the wavelength. The modulating waveform may be a baseband signal or at an intermediate radio frequency. In some examples, the baseband signal comprises a data signal for transmission in a communications network.

In some examples, the modulated spectral component is passed to a phase shift unit 12. The phase shift unit 12 is configured to delay or phase shift the wavelength. In cooperation with the other paths 6, the controlled delay or phase shift added to the wavelength provides for steering of the beam direction. The introduction of the delay to an optical spectral component provides for a true time delay, and so reduces or avoids squint. The time delay is provided according to a chromatic dispersion. A true time delay is obtained when phase dependency on the frequency is linear. For example, using the true time delay is generated by an optical fiber with a linear dispersion slope. This provides for true time delays for generating radio frequencies at discrete steps with a granularity equal to the wavelength spacing. An integrated component, e.g. a micro-ring, is suitable.

The phase shift unit 12 and modulator 10 may be considered as arranged in series. A wavelength selected by the wavelength selection device 8 (and transmitted from a drop port 9) passes through the phase shift unit 12 and modulator 10 consecutively. Thus, a selection of a wavelength, and transmission to a drop port results in both phase shift and modulation. The phase shift unit 12 and modulator 10 may be arranged in reversed order, so that the wavelength is modulated after the phase shift being applied.

In a further example, the modulation and the phase shift are applied separately. For example, the modulation and the phase shift are applied to different wavelengths or are applied to the same wavelength by a separate drop operation of the wavelength selection device.

After a wavelength has been phase shifted by the phase shift unit 12 and modulated by the modulator 10, the wavelength is re-inserted into the path 6. For example, the wavelength is passed to an add port 11 of the wavelength selection device 8, e.g. by an output of the phase shift unit 12. The wavelength selection device 8 is configured to receive back the modulated and phase shifted spectral component that was previously dropped. The wavelength selection device 8 adds or multiplexes the received modulated and phase shifted spectral component with the one or more other spectral components on the path 6. The wavelength selection device 8 is configured to output the modulated and/or phase shifted spectral component, as described below.

In the example shown, the wavelength selection device 8 comprises a plurality of drop ports 9 and a plurality of add ports 11. Each drop port 9 is arranged to pass a wavelength to a separate phase shift unit and modulator 10. In this example, each of the plurality of paths 6 has a plurality of associated phase shift units 12 and modulators 10. Each phase shift unit 12 and modulator 10 on a path 6 provides for an independent beam to be formed by the antenna. The independent beams may be at different frequencies and/or modulated by different signals. The phase shift applied by each phase shift unit may be independent or different to the other phase shift units. The wavelength selection device selects the appropriate one of the plurality of drop ports for the phase shift unit which is configured for that selected wavelength.

The wavelength selection device 8 may be controlled to pass one or more wavelengths through the wavelength selection device without being extracted. Such wavelengths are therefore not phase shifted or modulated. Such wavelengths are described as being passed through the wavelength selection device 8. The frequency of the spectral component is also not changed. The non-modulated spectral component may be referred to as a continuous wave optical frequency. In this example, only a modulated wavelength is phase shifted, a non-modulated wavelength is not phase shifted.

In some examples, the beamforming device may be controlled to stop one or more of the wavelengths. The wavelengths are not output along the path 6 from the wavelength selection device. For example, the wavelength selection device 8 may stop a wavelength using the ring resonators in the ROADM so that they do not to transmit light. For example, the wavelength can be stopped by detuning the ring, e.g. so that the ring resonator's central wavelength falls in between two optical frequencies.

In a further example, the optical modulator 10 is biased such that light is not transmitted. In this case, the spectral component is output at a drop port 9 to the modulator 10. The modulator 10 is then controlled to stop the spectral component, and not pass the spectral component to the phase shift unit 12 or to the wavelength selection unit 8. The modulator is biased to its highest attenuation point to stop the spectral component.

A heterodyning device 16 is connected to the output of each wavelength selection device 8. As such, each path 6 has a separate heterodyning device 16. The heterodyning device 16 is configured to generate a signal for transmission by the phased array antenna by heterodyning a plurality of selected spectral components associated with different ones of the spaced wavelengths of the laser light source. The signal output has a frequency which is a difference between the two optical spectral components which are heterodyned (mixed). The difference in frequency is controlled to be at a determined radio frequency. For a baseband frequency modulation, the difference in frequency of the two mixed wavelengths is a radio frequency, i.e. the radio frequency to be transmitted. For a modulation at an intermediate frequency, the frequency generated is a sum of the intermediate frequency and the difference in frequency of the two mixed optical wavelengths.

The heterodyned spectral components may be a modulated spectral component (i.e. modulated by modulated 10) and a non-modulated spectral component (i.e. a laser mode which has passed through the wavelength selection device without modulation).

In some aspects, the heterodyning device 16 is arranged to heterodyne one or more pairs of spectral components, i.e. wavelengths. In some examples, one spectral component is modulated, and one is not. A single wavelength may be included in one or more pair.

The heterodyning device 16 is any device which provides mixing of the optical wavelengths received, i.e. provide a non-linear response. In some examples, the heterodyning device 16 is a photodiode. By exploiting the quadratic response of the photodiode, continuous wave and modulated optical frequencies are mixed. The mixing in the heterodyning device 16 generates one or modulated, phase shifted radio frequencies are generated. The value of each generated radio frequency is equal to the difference in frequency between the two heterodyned frequency, e.g. one modulated and one continuous wave optical frequency.

Since the two wavelengths are generated from the same reference light source, they are locked. A difference in frequency between the two wavelengths corresponds to the radio signal frequency used by the antenna.

The RF signal(s) generated by each heterodyning device on a path 6 is transmitted to an antenna element 20. The antenna elements 20 are part of a phased array antenna. The phased array antenna comprises a plurality of antenna elements 20, for which a RF signal is separately generated on a line or path 6. In some examples, there is one path 6 for each antenna element 20. This allows for efficient beamforming of a plurality of RF carriers (e.g. for carrier aggregation) at the same time.

The beamforming device 1 comprises, or is connected to, a controller 80 configured to generate control signals. The control signals control the wavelength selection device 8, and optionally the distribution unit 4 and/or the modulators 10 and/or the phase shift units 12.

The controller 80 comprises a processing arrangement and memory. The controller is configured to run a computer program, for example provided on a computer program product, to control the functioning of the device as described. In some examples, the controller 80 is configured to control one or more of which spectral components are transmitted to the wavelength selection devices, which spectral components are dropped to a drop port for modulation and phase shifting, and/or which spectral components are passed through the wavelength selection device without phase shifting or modulation and/or which spectral components are stopped. Thus, the controller is arranged to control a frequency of the RF signal generated.

In the example shown, a separate filter is not needed to remove unwanted spectral components or unwanted RF signals. For example, the distribution unit 4 and/or wavelength selection device 8 (optionally in combination with the modulator 10) is arranged to remove unwanted spectral components. A selection of the bandwidth of the heterodyning device provides for unwanted RF components to be outside of the bandwidth of the heterodyning device, and so not generated. In further example, one or more filters are included in the beamforming device, and configured to remove one or spectral component and/or RF signal.

FIGS. 2, 3 and 4 shows example frequencies (i.e. spectral components) and their combination to generate a modulated RF signal for transmission by the phased array antenna. The optical frequencies, and the phase shift applied, provides for beamforming.

FIGS. 2, 3 and 4 shows a plurality of optical frequencies as output from the laser source 2. Each vertical line indicates a spectral component, and the relative frequency of each spectral component is indicated by its horizontal position. In some examples, the spectral components shown are the only spectral components which are received by the wavelength selection devices, for example, because the distribution unit has selected only those spectral components for a particular path. Alternatively, further spectral components shown are received by the wavelength selection device. Such further spectral components are either stopped prior to the heterodyning device or are not relevant to the corresponding. The spectral components shown in FIGS. 2, 3 and 4 are used to indicate the principle of optical RF signal generation, and are not intended to show a complete set of spectral components. The RF signals generated are sent to the antenna element for transmission.

FIG. 2 shows an example of a single carrier beamforming. In this example, two optical frequencies are used.

Figure 2A:
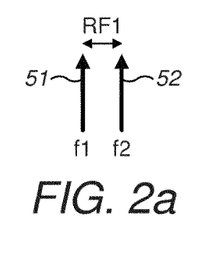
FIG. 2 is an illustration of selected spectral components according to an example.

In FIG. 2*a*, a first spectral component 51 at frequency f1 and a second spectral component 52 at frequency f2 are an example of the spectral components received at the wavelength selection device, as described above. The first and second spectral components 51,52 are separated by a radio frequency RF1 (i.e. RF1=f2−f1). The beamforming device is configured to generate for transmission a radio frequency carrier of frequency RF1.

Figure 2B:
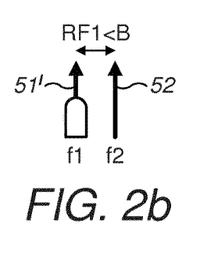

FIG. 2*b* shows a modified first spectral component 51' centered at frequency f1 and the second spectral component 52 at frequency f2 at the output of the wavelength selection device. One of the spectral components 51,52 is modulated, in this example, first spectral component 51 has been modulated, e.g. by modulator 10. The modulation has caused a broadening of the bandwidth B of the first spectral component 51. The frequency separation is still RF1 in this example. Alternatively, if the modulation is not at baseband, some frequency shift of the modulated spectral component 51 will be caused.

The frequency difference RF1 is less than a bandwidth of the heterodyning device 16. This allows the heterodyning device to generate a new signal at frequency RF1 for transmission. The radio frequency carrier at frequency RF1 carries the modulation signal.

Alternatively, the second spectral component 52 is modulated instead of the first spectral component 51. This does not change the principle of generating the RF signal.

FIG. 3 shows an example of beamforming with a plurality of carriers. This provides for beamforming with aggregation of two or more radiofrequency carriers.

Figure 3A:
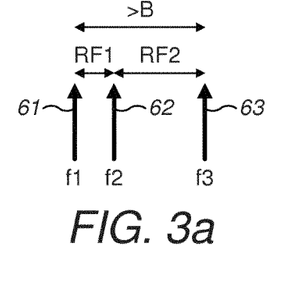
FIG. 3 is a further illustration of selected spectral components according to an example.

In FIG. 3a, a first spectral component 61 at frequency f1, a second spectral component 62 at frequency f2 and a third spectral component 63 at frequency f3 are an example of the spectral components received at the wavelength selection device 8, as described above.

The first and second spectral components 61,62 are separated by a radio frequency RF1 (i.e. RF1=f2−f1). The second and third spectral components 62,63 are separated by a radio frequency RF2 (i.e. RF2=f3−f2). The beamforming device is configured to generate for transmission a first radio frequency carrier of frequency RF1 and a second radio frequency carrier of frequency RF2. A sum of the frequency differences RF1 and RF2, i.e. the frequency separation of the first and third spectral components is larger than a bandwidth B of the heterodyning device, as discussed in more detail below.

Figure 3B:
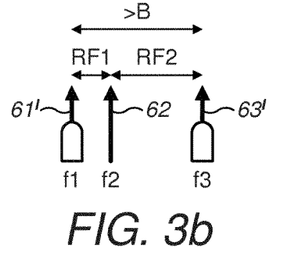

FIG. 3b shows a modified first spectral component 61' centered at frequency f1, the second spectral component 62 at frequency f2, and a modified third spectral component 63' centered at frequency f3 at the output of the wavelength selection device. In this example, a plurality of the spectral components 61,62,63 is modulated, in this example, first and third spectral components 61,63 have been modulated, e.g. by modulator 10. For example, a first modulation signal modulates the first spectral component 61 and a second modulation signal modulates the third spectral component. The modified (e.g. phase shift and modulated) and unmodified optical wavelengths will be referred to generically as spectral components of the spaced wavelengths of the laser light source.

The first and second modulation signals are applied by different modulators 10 in each path 6. For a particular path 6, the first spectral component 61 is dropped to a first modulator 10, and the third spectral component 10 is dropped to a different modulator 10. The modulation has caused a broadening of the bandwidth of the first and third spectral components. The frequency separation is still RF1 and RF2 respectively in this example. Alternatively, if the modulation is not at baseband, some frequency shift of the modulated spectral components will be caused.

The frequency difference RF1 and RF2 is less than a bandwidth of the heterodyning device. This allows the heterodyning device to generate a new signal at frequency RF1 and at RF2 for transmission. The radio frequency carrier at frequency RF1 carries the first modulation signal and the radio frequency carrier at frequency RF2 carries the second modulation signal. This provides for carrier aggregation. This example uses two pairs of frequencies to generate two modulated RF signals, with one spectral component (second spectral component) used in both pairs.

The frequency difference between the first spectral component 61 and the third spectral component 63 is larger than a bandwidth of the heterodyning device. Thus, signals are not generated at the heterodyning device from a mixing of the first spectral component and the third spectral component. This allows only the signals at RF1 and RF2 to be generated, for example without further filtering.

FIG. 4 shows an example of beamforming with a plurality of carriers. This provides for beamforming, and in some examples, with aggregation of two or more radiofrequency carriers.

Figure 4A:
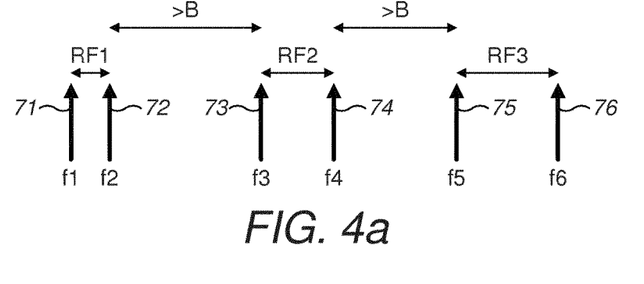
FIG. 4 is a further illustration of selected spectral components according to an example.

In FIG. 4a, a first spectral component 71 at frequency f1, a second spectral component 72 at frequency f2, a third spectral component 73 at frequency f3, a fourth spectral component 74 at frequency f4, a fifth spectral component 75 at frequency f5 and sixth spectral component 76 at frequency f6, are an example of the spectral components received at the wavelength selection device 8, as described above.

A first pair of spectral components, the first and second spectral components 71,72, are separated by a radio frequency RF1 (i.e. RF1=f2−f1). A further, second, pair of spectral components, the third and fourth spectral components 73,74, are separated by a radio frequency RF2 (i.e. RF2=f4−f3). A further, third, pair of spectral components, the fifth and sixth spectral components 75,76 are separated by a radio frequency RF3 (i.e. RF3=f6−f5).

The beamforming device is configured to generate for transmission a first radio frequency carrier of frequency RF1, a second radio frequency carrier of frequency RF2 and a third radio frequency carrier of frequency RF3. A frequency difference between the pairs of bandwidths, e.g. between the second spectral component and the third spectral component is larger than a bandwidth B of the heterodyning device, as discussed in more detail below.

Figure 4B:
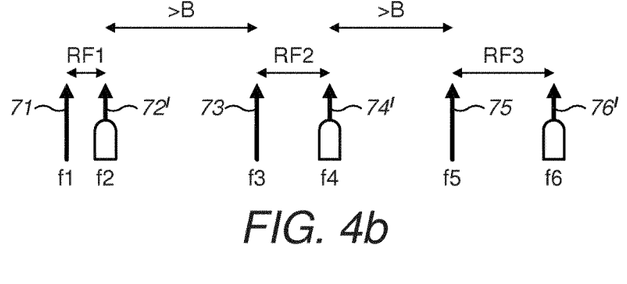

FIG. 4b shows a modified spectral component in each pair. In this example, the higher frequency spectral component is modulated, i.e. the second spectral component 72' centered at frequency f2, the fourth spectral component 74' at frequency f4, and a modified sixth spectral component 76' centered at frequency f6 at the output of the wavelength selection device. Alternatively, the other (e.g. lower) spectral component of one or more of the pairs is modulated.

For example, a first modulation signal modulates the second spectral component 72, a second modulation signal modulates the fourth spectral component 74 and a third modulation signal modulates the sixth spectral component 76. Different modulations are applied by different modulators 10 on a line or path 6. The arrangement described provides for a plurality of spectral components to be independently modulated, providing for the generation of a plurality of RF carriers at each antenna element. The wavelength selection device is configured to select a wavelength to be dropped to a particular modulator, according to the modulation to be applied to the resultant RF signal.

The frequency difference RF1, RF2 and RF3 is less than a bandwidth B of the heterodyning device. This allows the heterodyning device to generate a new signal at frequency RF1, at RF2 and at RF3 for transmission. The radio frequency carrier at frequency RF1, RF2 and RF3 may carry a separately applied modulation. This provides for carrier aggregation. This example uses a plurality (e.g. three) pairs of frequencies to generate a modulated RF signal per pair, with each spectral component used in only one pair.

A frequency difference between the first pair of spectral components 71,72 and the second pair of spectral component 73,74 is larger than a bandwidth B of the heterodyning device. Similarly, the frequency difference between the second pair of spectral components 73,74 and the third pair of spectral components 75,76 is larger than a bandwidth B of the heterodyning device. The difference between pairs refers to the closest spectral components in frequency. This is so that no spectral component of different pairs is able to mix and generate a RF signal which can be transmitted. In some aspects, to avoid any beating between different frequency pairs, the frequency difference between the second (higher) frequency of a pair and the first (lower) frequency of a consecutive (and higher) pair must be higher than the bandwidth B of the heterodyning device.

Thus, signals are not generated at the heterodyning device from a mixing of spectral components corresponding to different pairs, e.g. between second spectral component and the third spectral component. This allows only the signals at RF1, RF2, RF3 to be generated, for example without further filtering.

This example has been described with three pairs of spectral components to generate three RF signals. Other numbers of pairs of spectral components may be heterodyned, e.g. two, four or five pairs.

In some examples, the beamforming device is configured to generate RF signals using a combination of one or more of the above examples.

Aspects relate to an optical beamforming arrangement and method to send one or multiple radio carriers to each antenna element of an arrayed antenna. In some examples, the arrangement uses a wavelength selective reconfigurable optical device (distribution unit) to split a comb of phase synchronous optical frequencies among different optical lines 6. Each line is connected to an antenna element through a photodetector. At each line, a subset of the optical frequencies is optically modulated by the RF modulating signals to be sent to the antenna element. A reconfigurable wavelength selective device at each line selects the optical frequencies to output to the heterodyning device, and a subset of the received spectral components to modulate. This provides for only the desired set of radio frequencies to be present at each antenna element.

The phased array antenna may alternatively be referred to as a phased array. The phased array may be considered as comprising a plurality of antennas (i.e. described above using the term 'element').

Figure 5:
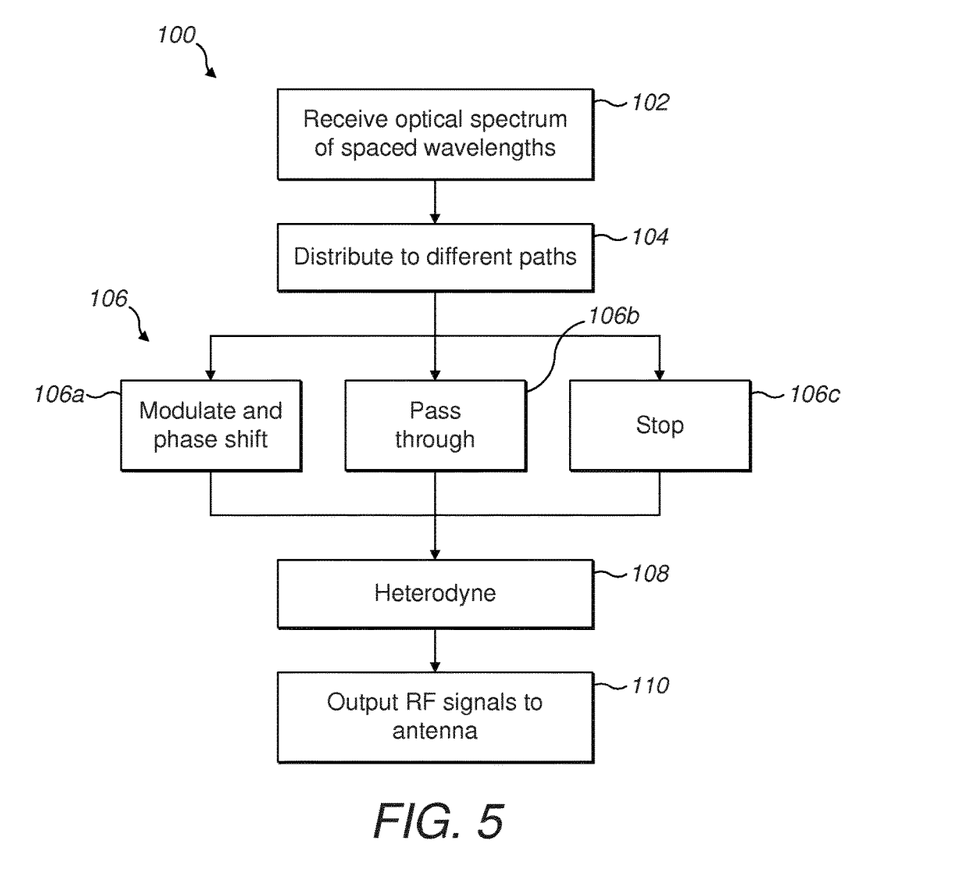
FIG. 5 is a method according to an aspect of the present disclosure.

FIG. 5 illustrates an example method 100 for operating the beamforming device 1.

In 102, optical wavelengths or spectral components are received. The receiving of the optical wavelengths may comprise generating the optical wavelengths. For example, the optical wavelengths (or spectral components) are from the mode locked laser 2.

In 104, the spectral components are distributed to different paths through the beamforming device. In some examples, all spectral components are distributed to all paths. In other examples, a selection of a subset of the spectral components is made for each path.

In 106, the spectral components are each selected for one of modulation and/or phase shifting in 106a, passing though in 106b or stopping in 106c. The wavelength selective device 8, e.g. functioning as a ROADM, is able to control which spectral components are modulated, phase shifted or stopped by selectively switching one or more of the spectral component to a drop port, where the spectral component is passed to another component to carry out the function. Pass through is obtained if the wavelength selective device selectively does not drop the spectral component. In the example shown, a separate wavelength selective 8 is connected to each optical path 6. Each wavelength selective 8 is controlled to phase shift and modulate, pass through unchanged or stop the same optical wavelengths on each path, in order to form the beam.

In 108, a pair of the spectral components is heterodyned. For example, this is by a photodiode.

In 110, generated RF signals are output to a plurality of antenna elements 20 to be transmitted together. This forms the transmit beam.

The invention claimed is:

1. A beamforming device for a phased array antenna, the beam forming device comprising:
   a laser light source arranged to provide an optical spectrum comprising a plurality of spectral components having spaced wavelengths; and
   a distribution unit configured to distribute one or more of the plurality of spectral components onto a plurality of optical paths, at least one of the plurality of optical paths comprising:
      a wavelength selection device configured to receive two or more of the plurality of spectral components;
      one or more phase shifters connected to the wavelength selection device, wherein each of the one or more phase shifters is configured to introduce a phase shift to at least one received spectral component; and
      a heterodyning device configured to generate a signal for transmission by an element of the phased array antenna, wherein the heterodyning device is configured to heterodyne a plurality of the received spectral components of the laser light source, and
   wherein the wavelength selection device is further configured to:
      selectively transmit, to a phase shifter of the one or more phase shifters, a received spectral component;
      receive, from the phase shifter, the received spectral component having a phase shift introduced by the phase shifter; and
      output, to the heterodyning device, the received spectral component having the phase shift introduced by the phase shifter.

2. The beamforming device of claim 1, wherein the wavelength selection device is a Reconfigurable Optical Add Drop Multiplexer (ROADM).

3. The beamforming device of claim 2, wherein the ROADM comprises one or more drop ports configured to drop the received spectral component to the phase shifter, wherein the ROADM further comprises one or more add ports configured to receive the received spectral component having the phase shift introduced by the phase shifter, and wherein the ROADM is configured to multiplex the received spectral component having the phase shift introduced by the phase shifter with one or more others of the received spectral components.

4. The beamforming device of claim 1, wherein the wavelength selection device is further configured to transmit one or more of the received spectral components to the heterodyning device without transmission to the phase shifter.

5. The beamforming device of claim 1, wherein the beamforming device is configured to stop one or more of the received spectral components from transmission to the heterodyning device.

6. The beamforming device of claim 1, further comprising a modulator configured to modulate at least one received spectral component received from the wavelength selection device.

7. The beamforming device of claim 6, wherein the modulator is arranged in series with one of the one or more phase shifters.

8. The beamforming device of claim 6, wherein the wavelength selection device or the modulator is further configured to stop one or more of the received spectral components from transmission to the heterodyning device.

9. The beamforming device of claim 1, wherein two or more of the plurality of optical paths comprise a respective wavelength selection device, each of which is connected to a respective phase shifter, such that the beamforming device is configured to form a plurality of beams at the phased array antenna.

10. The beamforming device of claim 1, wherein the wavelength selection device is further configured to transmit to the heterodyning device one or more pairs of spectral components, wherein a frequency separation of the one or more pairs of the spectral components within a pair is less than a bandwidth of the heterodyning device, and wherein a frequency separation between the one or more pairs is more than the bandwidth of the heterodyning device.

11. The beamforming device of claim 1, wherein the wavelength selection device is further configured to transmit to the heterodyning device a single spectral component to be heterodyned with each of a first and second further spectral component, to generate a first and second signal for transmission by the phased array antenna.

12. The beamforming device of claim 1, wherein the distribution unit is a splitter or a wavelength selective splitter (WSS).

13. The beamforming device of claim 1, wherein at least one of the wavelength selection device and the distribution unit are implemented in integrated photonics.

14. A method of beamforming for a phased array antenna, the method comprising:
receiving a laser light source arranged to provide an optical spectrum comprising a plurality of spectral components having spaced wavelengths,
distributing one or more of the plurality of spectral components onto a plurality of optical paths,
receiving, at a wavelength selection device and via a path of the plurality of optical paths, two or more of the plurality of spectral components;
selectively transmitting, from the wavelength selection device to a phase shifter, a spectral component of the received spectral components;
receiving, at the wavelength selection device and from the phase shifter, the spectral component having a phase shift introduced by the phase shifter; and
generating a signal for transmission by an element of the phased array antenna, by heterodyning a plurality of the received spectral components.

15. The method of claim 14, further comprising
selectively transmitting a spectral component of the received spectral components to the phase shifter using a Reconfigurable Optical Add Drop Multiplexer (ROADM).

16. The method of claim 14, further comprising
transmitting one or more of the received spectral components to the heterodyning device without transmission to the phase shifter.

17. The method of claim 14, further comprising stopping one or more of the received spectral components from transmission to the heterodyning device.

18. The method of claim 14, further comprising:
transmitting, to a modulator, the spectral component of the received spectral components; and
receiving, from the modulator, the spectral component having a modulation applied by the modulator.

19. The method of claim 14, further comprising:
receiving, at another wavelength selection device and via another path of the plurality of optical paths, two or more of the plurality of spectral components;
selectively transmitting, from the other wavelength selection device to another phase shifter, another spectral component received by the other wavelength selection device;
receiving, at the other wavelength selection device and from the another phase shifter, the other spectral component having another phase shift introduced by the other phase shifter; and
generating another signal for transmission by another element of the phased array antenna, by heterodyning a plurality of the spectral components received by the other wavelength selection device.

20. The beamforming device of claim 1, wherein the wavelength selection device comprises one or more ring resonators.

* * * * *